Jan. 23, 1923. 1,442,992.
C. V. BANES.
FLYTRAP.
FILED MAR. 15, 1922.
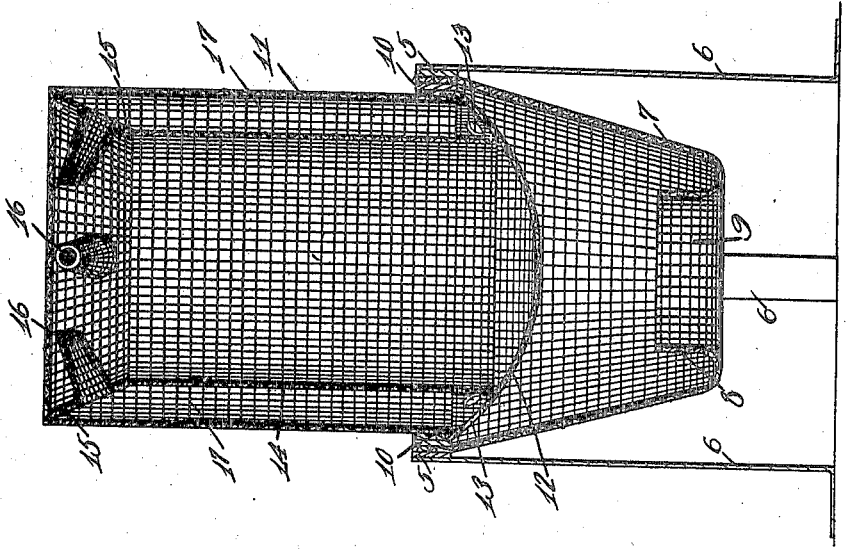
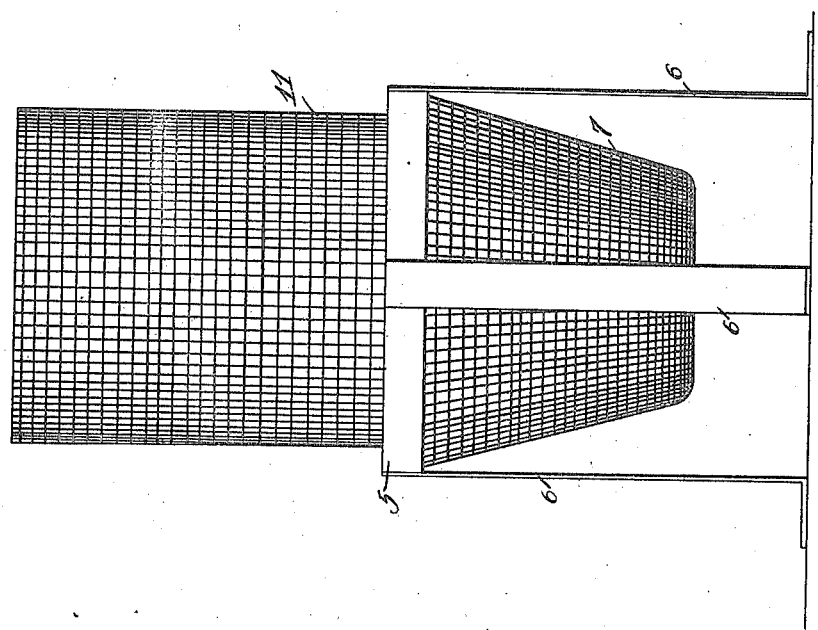
C. V. Banes, Inventor Patented Jan. 23, 1923.

1,442,992

UNITED STATES PATENT OFFICE.

CHESLEY V. BANES, OF KINROSS, IOWA.

FLYTRAP.

Application filed March 15, 1922. Serial No. 544,057.

*To all whom it may concern:*

Be it known that I, CHESLEY V. BANES, a citizen of the United States, residing at Kinross, in the county of Keokuk and State of Iowa, have invented a new and useful Flytrap, of which the following is a specification.

This invention has reference to insect traps, and more particularly to a trap especially designed for catching flies or the like.

The primary object of the invention is to provide a trap of a construction to admit abundance of light so that the insects will readily enter the trap.

Another object of the invention is to provide a trap constructed so that the flies caught within the trap will not darken the same and exclude insects which may pass into the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a trap constructed in accordance with the present invention.

Figure 2 is a vertical sectional view through the trap.

Referring to the drawing in detail, the trap embodies a band 5 to which are secured the legs 6 that support the trap in spaced relation with the surface on which the trap is positioned, to provide a clearance admitting insects thereto.

The lower portion of the trap comprises a tapered or funnel-shaped member 7 formed of wire mesh material, the lower extremity thereof extending upwardly as at 8, the same being disposed in spaced relation with the walls of the funnel-shaped member 7 to provide a passageway therebetween, the portion 8 acting as an obstruction to prevent insects from returning to the entrance opening 9 of the trap. The member 7 is fitted within the band 5 and is held therein as by means of the band 10, which is shown as forcing the upper extremity of the member 7 into close engagement with the band 5.

The main or body portion of the trap is indicated at 11, and is also formed of wire mesh material, the same being circular in cross section. This body portion 11 has its lower extremity open to admit insects to the upper portion thereof and as shown, the body portion 11 has its lower end fitted within the confines of the upper end of the inverted dome-shaped member 12 the member 13 having a portion thereof positioned between the band 10 and lower end of the body portion 11 as clearly shown by Figure 2 of the drawing. Formed within the dome-shaped member 12 at points adjacent to the upper edge thereof, are openings 13, which openings provide communication between the interior of the member 7 and the interior of the body portion 11.

Positioned within the body portion 11, is an inner member 14 which has an outwardly extended portion 15 engaging the wall of the body portion 11, the lower end of the inner member 14 engaging the inverted dome-shaped member as shown by Figure 2 of the drawing. This member 14 is also formed of wire mesh material to admit light to the interior of the trap.

Tubular members 16 extend through the outwardly extended portion 15 and provide communication between the passageway 17 formed between the body portion 11 and in the member 14, thereby admitting insects which pass upwardly to the passageway to the interior of the trap.

It might be further stated that a suitable bait may be positioned within the trap to attract the insects to the interior thereof.

From the foregoing, it will be seen that the body portion 11, as well as the inner member 14 may be readily and easily removed from the bands 5 and 10 which support the same in order that the contents of the trap may be emptied.

The insects enter the trap through the opening 9 from which they pass upwardly through the openings 13 and into the passageway 17. It follows that the insects on their upward passage between the body portion 11 and member 14, are attracted to the tubular members 16, from which they enter the inner member 14, it being practically impossible for the insects to find their way from the inner member 14.

Having thus described the invention, what is claimed as new is:—

1. An insect trap comprising a funnel-shaped member having an upwardly extending lower portion, supporting bands accommodating the upper end of the funnel-shaped member, a body portion formed of wire mesh material, an inner member formed of wire mesh material and positioned within the body portion in spaced relation therewith, an inverted dome-shaped member secured within the band, and receiving the lower end of the inner member, said inverted dome-shaped member having openings providing communication between the funnel-shaped member and passageway, and means providing communication between the passageway and inner member.

2. In an insect trap, supporting legs, a band carried by the supporting legs, a downwardly extended member formed of wire mesh material, a body portion fitted within the band, and formed of wire mesh material, an inner member formed of wire mesh material and disposed in spaced relation with the body portion, an inverted dome-shaped member receiving the lower end of the inner member, said dome-shaped member having openings, directly under the passageway, and tubular members providing communication between the passageway and inner member.

3. In an insect trap, supporting bands, leg members having connection with the supporting bands, a funnel-shaped member formed of wire mesh material, secured within the supporting bands, a body portion having its lower end positioned within the supporting band, an inner member positioned within the body portion and disposed in spaced relation therewith to provide a passage way, said inner member having an outwardly extended portion, tubular members supported by the oppositely extended portion and providing communication between the passageway and interior of the inner member, a curved member embracing the the lower ends of the body portion and inner member, said curved member having openings, and said openings providing communication between the funnel-shaped member and passageway.

In testimony that I claim the foregoing as my own, I have hereto affixed my signature in the presence of two witnesses.

CHESLEY V. BANES.

Witnesses:
A. C. SCHANENBERG,
H. L. WESTFOLL.